United States Patent
Hsuan et al.

(10) Patent No.: US 9,164,302 B2
(45) Date of Patent: Oct. 20, 2015

(54) REPAIRABLE TOUCH PANEL

(71) Applicant: INTERNATIONAL BUSINESS MACHINES CORPORATION, Armonk, NY (US)

(72) Inventors: Wei-Yi Hsuan, Taipei (TW); Yi-Sheng Lee, Taipei Hsien (TW)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 14/067,516

(22) Filed: Oct. 30, 2013

(65) Prior Publication Data
US 2014/0139755 A1 May 22, 2014

(30) Foreign Application Priority Data
Nov. 22, 2012 (TW) .............................. 101143636 A

(51) Int. Cl.
G06F 3/045 (2006.01)
G02F 1/13 (2006.01)
G02F 1/1362 (2006.01)
G02F 1/1333 (2006.01)
G06F 3/041 (2006.01)

(52) U.S. Cl.
CPC .......... G02F 1/1309 (2013.01); G02F 1/13338 (2013.01); G02F 1/136259 (2013.01); G06F 3/041 (2013.01); Y10T 29/49117 (2015.01)

(58) Field of Classification Search
CPC ....... G06F 3/045; G09G 3/006; G02F 1/1309; G02F 1/136259; G02F 1/136263
See application file for complete search history.

(56) References Cited

U.S. PATENT DOCUMENTS

| 5,729,309 | A | * | 3/1998 | Na et al. ........................ 349/54 |
|---|---|---|---|---|
| 5,859,679 | A | * | 1/1999 | Song ............................ 349/54 |
| 6,111,558 | A | * | 8/2000 | Jeung et al. ................... 345/93 |
| 6,512,512 | B1 | | 1/2003 | Blanchard |
| 6,525,705 | B1 | * | 2/2003 | Ishii et al. ..................... 345/87 |
| 7,394,508 | B2 | * | 7/2008 | Chen et al. .................... 349/54 |
| 7,438,978 | B2 | | 10/2008 | Kotsubo et al. |
| 7,532,271 | B2 | * | 5/2009 | Hsu et al. ...................... 349/54 |
| 8,023,058 | B2 | * | 9/2011 | Han et al. ...................... 349/54 |
| 8,106,787 | B2 | | 1/2012 | Nurmi |
| 8,290,513 | B2 | * | 10/2012 | Forstall et al. ............. 455/456.3 |
| 8,390,606 | B2 | * | 3/2013 | Itoh et al. .................... 345/204 |
| 8,872,744 | B2 | * | 10/2014 | Kitayama et al. .............. 345/96 |
| 8,952,920 | B2 | * | 2/2015 | Kuo et al. .................... 345/174 |
| 2003/0103045 | A1 | * | 6/2003 | Shiraishi ..................... 345/204 |
| 2003/0179158 | A1 | * | 9/2003 | Sakaki .......................... 345/55 |

(Continued)

FOREIGN PATENT DOCUMENTS

| CN | 1267811 C | 8/2006 |
|---|---|---|
| TW | 200630902 A | 9/2006 |

OTHER PUBLICATIONS

K.A. Sierros, "Durable transparent carbon nanotube films for flexible device components", Contents lists available at ScienceDirect Thin Solid Films, Jul. 13, 2010.

*Primary Examiner* — Joe H Chang
(74) *Attorney, Agent, or Firm* — Russell Ng PLLC; Parashos Kalaitzis

(57) ABSTRACT

A display apparatus includes a touch panel having a touch failure portion and a pair of first contacts and a repairing component having a pair of second contacts. The repairing component is positioned on the touch panel at a position corresponding to the touch failure portion and the pair of first contacts is electrically coupled to the pair of second contacts.

15 Claims, 8 Drawing Sheets

(56) References Cited

U.S. PATENT DOCUMENTS

| | | | |
|---|---|---|---|
| 2004/0012727 A1* | 1/2004 | Kim et al. | 349/54 |
| 2005/0263772 A1* | 12/2005 | Park | 257/72 |
| 2006/0132465 A1* | 6/2006 | Nishikawa et al. | 345/174 |
| 2007/0257893 A1* | 11/2007 | Philipp et al. | 345/173 |
| 2007/0285595 A1* | 12/2007 | Hirao | 349/56 |
| 2008/0094372 A1* | 4/2008 | Philipp | 345/173 |
| 2009/0115959 A1* | 5/2009 | Lee et al. | 349/192 |
| 2010/0007615 A1* | 1/2010 | Wu et al. | 345/173 |
| 2010/0283740 A1 | 11/2010 | Chao | |
| 2011/0134089 A1* | 6/2011 | Ozeki et al. | 345/205 |
| 2011/0169745 A1 | 7/2011 | Fang et al. | |
| 2011/0261001 A1 | 10/2011 | Liu | |
| 2012/0188743 A1 | 7/2012 | Wilson et al. | |

* cited by examiner ly, and in consequence the electrical conductivity of the conductive layers decreases greatly; as a result, the IC controller either fails to determine the position of the press point or determines the position of the press point inaccurately, thereby losing touch capability which might otherwise be functioning. As regards the application of a Point Of Sales System (POS), a specific point on the resistance-type touch panel module is likely to be pressed frequently, and, as a result, the resistance-type touch panel module is very likely to malfunction or get damaged when pressed frequently.

REPAIRABLE TOUCH PANEL

This application is based on and claims the benefit of priority from Taiwan Patent Application 101143636, filed on Nov. 22, 2012.

BACKGROUND OF THE INVENTION

The present invention relates to data processing systems, and more particularly, to a method for repairing a touch panel, a repairing component, and a touch panel.

A conventional data processing system usually has a touch panel whereby a user enters data into the system. The touch panel has two typical purposes: it functions as a pointing device, such as a mouse, in personal computers (such as tablet computers); when used in a Point of Sales System (POS), it is conducive to paperless input and thus facilitates the sale of goods at shops or warehouse stores.

According to structure and design, touch panels are divided into various categories, namely resistance-type touch panels, capacitance-type touch panels, sound wave touch panels, and optical touch panels. Taking a resistance-type panel module as an example, it comprises two conductive layers spaced apart by a short distance and a plurality of spacers therebetween. As soon as a user presses the resistance-type touch panel, the two conductive layers get connected at a specific point, and thus a resistance/voltage change occurs at the point. An analog signal with a voltage change is converted into a digital signal by an analog-to-digital converter (AD converter) to determine the Cartesian coordinates of a press point and thereby calculate the position of the press point with an IC controller.

The two conductive layers are disposed on a first substrate and a second substrate, respectively, and made of indium tin oxide (ITO). It is not uncommon that users use the resistance-type panel module frequently, for example, by touching, pressing, or writing to it, to thereby cause the conductive layers to crack or peel off or cause the substrate to lose its resilience, and in consequence the electrical conductivity of the conductive layers decreases greatly; as a result, the IC controller either fails to determine the position of the press point or determines the position of the press point inaccurately, thereby losing touch capability which might otherwise be functioning. As regards the application of a Point Of Sales System (POS), a specific point on the resistance-type touch panel module is likely to be pressed frequently, and, as a result, the resistance-type touch panel module is very likely to malfunction or get damaged when pressed frequently.

As regards problem-solving solutions available to a Point Of Sales System (POS), when informed by a warehouse store of malfunction or damage, a supplier dispatches a maintenance technician to the warehouse store to replace the malfunctioning or damaged touch panel module with a good touch panel module. However, the solution requires significant manpower and resources, is inefficient, and incurs high costs.

BRIEF SUMMARY

In one aspect, the present invention provides a method for repairing a touch panel, a touch panel, a repairing component, a touch panel assembly, and a touch display device, and the method is efficient, simple, labor-saving, resource-saving, and environmentally friendly.

According to an embodiment of the present invention, the present invention provides a method for repairing a touch panel having a touch failure part and a pair of first contacts. The method comprises the steps of: providing the touch panel; providing a repairing component having a pair of second contacts; positioning on the touch panel the repairing component corresponding in position to the touch failure part; and electrically coupling the pair of first contacts and the pair of second contacts.

According to an embodiment of the present invention, the touch panel further comprises a main touch area with two edges on which the first contacts are disposed, respectively, and the repairing component further comprises a repairing touch area with two edges on which the second contacts are disposed, respectively.

According to an embodiment of the present invention, the main touch area and the repairing touch area have substantially identical touch-control structure.

According to an embodiment of the present invention, the main touch area further comprises: a first substrate; a first conductive layer disposed on the first substrate; a spacer layer having a plurality of spacers and disposed on the first conductive layer; a second conductive layer disposed on the spacers; and a second substrate disposed on the second conductive layer.

According to an embodiment of the present invention, the main touch area further comprises: a probe disposed inside the second conductive layer; four voltage input lines disposed inside the first conductive layer; four second voltage input lines disposed inside the first conductive layer; and a second probe disposed inside the first conductive layer.

According to an embodiment of the present invention, after the pair of first contacts and the pair of second contacts have been electrically coupled, the four second voltage input lines and the second probe operate jointly to perform the touching and detecting operation of the repairing component, whereas the four voltage input lines and the first probe operate jointly to perform the touching and detecting operation on a portion of the touch panel, wherein the portion of the touch panel does not correspond in position to the repairing component.

According to an embodiment of the present invention, after the pair of first contacts and the pair of second contacts have been electrically coupled, the four second voltage input lines are electrically coupled to a repairing component first conductive layer of the repairing touch area, and the second probe is electrically coupled to a repairing component second conductive layer of the repairing touch area.

According to an embodiment of the present invention, by making the second substrate, the second conductive layer, and the spacer layer shorter than the first conductive layer and the first substrate, the first conductive layer is exposed, and thus the first contacts are formed.

According to an embodiment of the present invention, the repairing touch area further comprises: a repairing component first substrate; a repairing component first conductive layer disposed on the repairing component first substrate; a repairing component spacer layer having a plurality of spacers and disposed on the repairing component first conductive layer; a repairing component second conductive layer disposed on the repairing component spacers; and a repairing component second substrate disposed on the repairing component second conductive layer.

According to an embodiment of the present invention, the second contacts are formed by making the repairing component first conductive layer, the repairing component second conductive layer, and the repairing component second substrate longer than the repairing component first substrate and the repairing component spacer layer, and an isolating layer is formed between the repairing component first conductive layer and the repairing component second conductive layer and positioned distal to the repairing component spacer layer to thereby isolate the repairing component first conductive layer and the repairing component second conductive layer.

According to an embodiment of the present invention, the present invention provides a repairing component for repairing a touch panel having a touch failure part, a main touch area, and a pair of first contacts. The first contacts are disposed on two edges of the main touch area, respectively. The repairing component comprises: a repairing touch area; and a pair of second contacts disposed on two edges of the repairing touch area, wherein, by electrically coupling the pair of first contacts and the pair of second contacts, the repairing component is disposed on the touch panel and corresponds in position to the touch failure part.

According to an embodiment of the present invention, the repairing touch area further comprises: a repairing component first substrate; a repairing component first conductive layer disposed on the repairing component first substrate; a repairing component spacer layer having a plurality of spacers and disposed on the repairing component first conductive layer; a repairing component second conductive layer disposed on the repairing component spacers; and a repairing component second substrate disposed on the repairing component second conductive layer.

According to an embodiment of the present invention, the present invention provides a touch panel having a touch failure part reparable by a repairing component. The touch panel comprises: a main touch area; and a pair of first contacts disposed on two edges of the main touch area, wherein the repairing component comprises a repairing touch area and a pair of second contacts disposed on two edges of the repairing touch area such that, in response to a position of a touch failure part occurring to the main touch area, the pair of first contacts and the pair of second contacts are electrically coupled to position the repairing component on the touch panel.

According to an embodiment of the present invention, a touch panel assembly comprises the repairing component and the touch panel.

According to an embodiment of the present invention, a touch display device comprises a display panel, the repairing component, and the touch panel.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
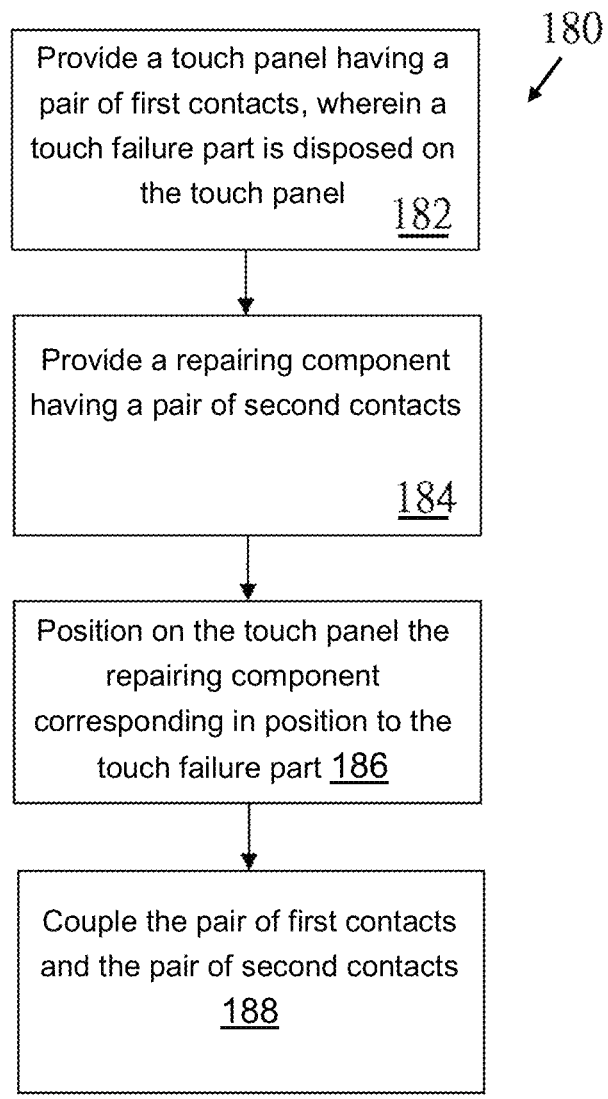
FIG. 1 is a flowchart of a method for repairing a touch panel according to a preferred embodiment of the present invention.
Figure 2:
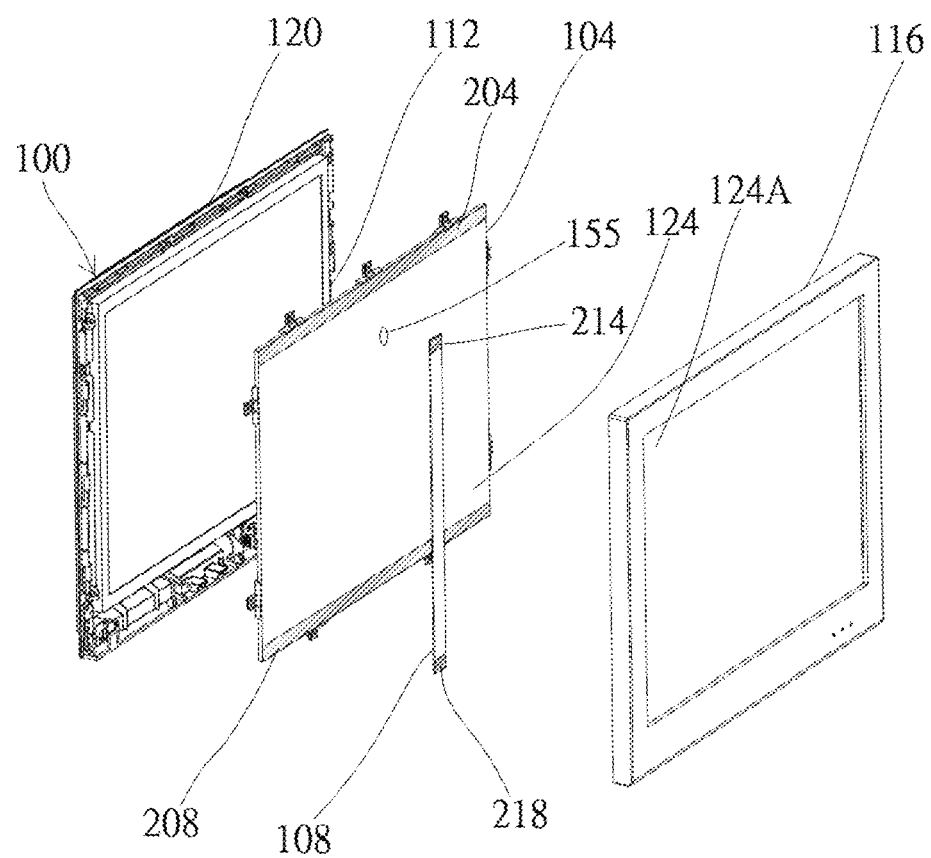
FIG. 2 is an exploded view of a display device according to a preferred embodiment of the present invention.

Referring to FIG. 1, there is illustrated a flowchart of a method 180 for repairing a touch panel 104 (see FIG. 2) according to a preferred embodiment of the present invention. The touch panel 104 has a touch failure part 155 (see FIG. 2). The touch panel 104 has a pair of first contacts 204, 208 (see FIG. 2). The method 180 comprises the steps as follows:

Step 182: providing the touch panel 104;

Step 184: providing a repairing component 108, wherein the repairing component 108 has a pair of second contacts 214, 218 (see FIG. 2);

Step 186: positioning on the touch panel 104 the repairing component 108 corresponding in position to the touch failure part 155; and Step 188: electrically coupling the pair of first contacts 204, 208 and the pair of second contacts 214, 218.

Referring to FIG. 2, there is shown an exploded view of a display device 100 according to the present invention. The display device 100 can be, but is not limited to, a touch display device, and comprises a touch panel 104, a display panel 112, and cases 116, 120. The display device 100 can further include or be utilized in combination with a computing device 110 (including, but not limited to, a main system or a computer, see FIG. 5) and a control circuit 236 (see FIG. 5).

According to a preferred embodiment of the present invention, the touch display device 100 can be, but is not limited to, a resistance-type touch display device, or a capacitance-type touch display device. In the situation where the touch display device 100 is a resistance-type touch display device, the touch display device 100 can include a resistance-type touch panel module 104, a display panel module 112, a computing device 110 (see FIG. 5), a control circuit 236 (see FIG. 5), and the cases 116, 120. The components are disposed inside the cases 116, 120. The cases 116, 120 are provided in the form of an upper frame 116 and a lower frame 120. The upper frame 116 is also known as a display device panel (bezel) and is disposed on the edges of the surface of the resistance-type touch panel module 104. The lower frame 120 contains components, such as the computing device 110, the control circuit 236, and a backlight illumination device (not shown), which are behind the display panel module 112. The structure of the resistance-type touch panel module 104 is described in detail later. Both the computing device 110 and the control circuit 236 are mounted on a motherboard (not shown). The control circuit 236 performs decoding, such that decoded signals are sent again to the computing device 110 mounted on the motherboard. The aforesaid components are part of a conventional resistance-type touch display device and thus are not described herein for the sake of brevity.

FIG. 2 illustrates a repairing component 108 for repairing the touch failure part 155 of the touch panel 104, including but not limited to a part of cracked or peeled conductive layers or a part of substrate that has lost resilience thereof. The shape of the repairing component 108 includes, but is not limited to, a strip-like shape, and a rectangle. The manner in which the repairing component 108 is disposed on the touch panel 104 includes, but is not limited to, vertically, horizontally, diagonally, and obliquely. The repairing component 108 is structurally identical or substantially similar to that of the resistance-type touch panel module 104 and has the pair of second contacts 214, 218. The details, structure, and operation principle of the repairing component 108 are described and explained later.

For instance, the resistance-type touch panel module 104 and the repairing component 108 operate in conjunction to repair the touch failure part 155 and to enable the touch failure part 155 to restore its touch functionality. The resistance-type touch panel module 104 and the repairing component 108 are disposed inside the cases 116, 120 and coupled to the display panel module 112. The display panel module 112 includes, but is not limited to, a rectangular liquid crystal display module. A contact 124 is defined on the display panel module 112 and has a shape including but not limited to a rectangle or a square. The contact 124 is substantially aligned with an internal area 124A defined by the upper frame 116. In FIG. 2, the upper frame 116 of the resistance-type touch display device 101 has been moved aside, and thus it is possible for the user to observe directly the component beneath the upper frame 116, such as the resistance-type touch panel module 104, the repairing component 108, and the display panel module 112.

After reading the information contained in the frame displayed on the contact 124, the user can operate a combination of the resistance-type touch panel module 104 and the repairing component 108 according to the displayed information. As soon as the user operates and touches the combination, the touched part sends a position signal to the control circuit 236 disposed on the motherboard, such that the position signal can be decoded. The decoded signal is further sent to the computing device 110 mounted on the motherboard to provide a reference for subsequent operation of the computing device 110.

Figure 3:
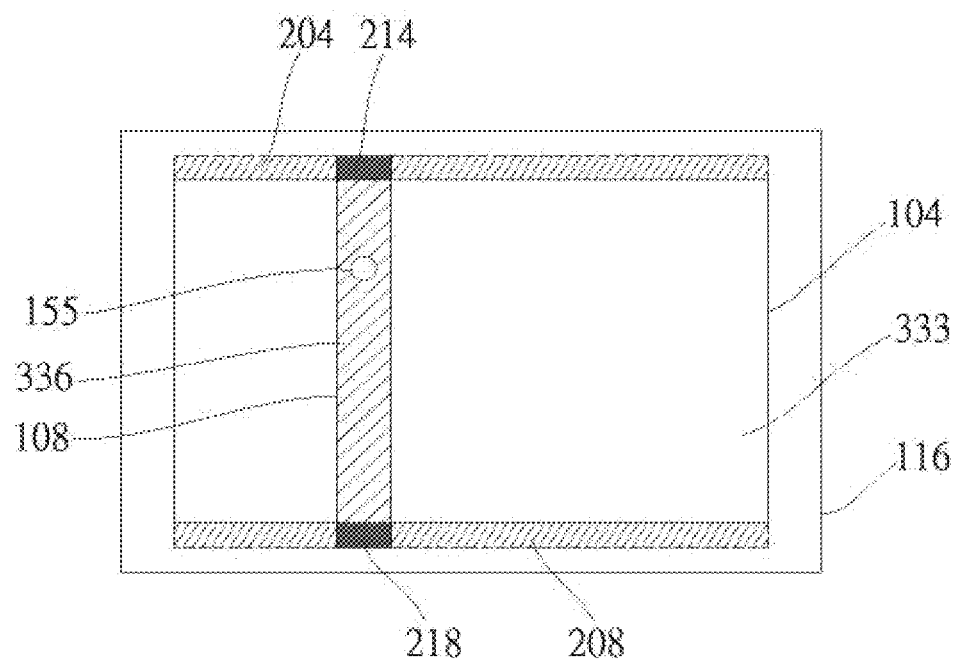
FIG. 3 is a schematic view of joint operation of a resistance-type touch panel module and a repairing component according to a preferred embodiment of the present invention.

Referring to FIG. 3, there is shown a schematic view of joint operation of the resistance-type touch panel module 104 and the repairing component 108 according to a preferred embodiment of the present invention. The resistance-type touch panel module 104 comprises a main touch area 333 and the first contacts 204, 208 disposed on the edges of the two ends of the main touch area 333, respectively. The repairing component 108 comprises a repairing touch area 336 and the second contacts 214, 218 disposed on the edges of the two ends of the repairing touch area 336, respectively. If the user discovers the touch failure part 155 on the main touch area 333, the user can not only cover the touch failure part 155 fully with the repairing component 108 but also electrically couple the pair of first contacts 204, 208 and the pair of second contacts 214, 218. Upon completion of the repair operation, the user installs the upper frame 116. Upon completion of the installation of the upper frame 116, the pair of first contacts 204, 208 and the pair of second contacts 214, 218 are hidden behind the upper frame 116. After being electrically coupled, the pair of first contacts 204, 208 and the pair of second contacts 214, 218 can be laminated together or glued together with a conductive adhesive so as to be fixed in place. The repairing component 108 is fixed to the resistance-type touch panel module 104 in one of the following manners, namely, being glued with an adhesive tape, being glued with a glue, and by electrostatic adsorption.

Figure 4:
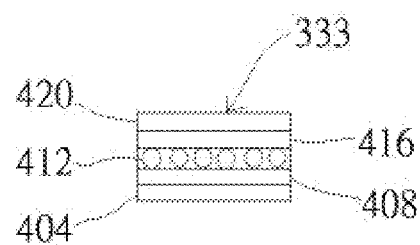
FIG. 4 is a section view of a main touch area of the resistance-type touch panel module and a repairing touch area of the repairing component according to a preferred embodiment of the present invention.

Referring to FIG. 4, there is shown a section view of the main touch area 333 of the resistance-type touch panel module 104 and the repairing touch area 336 of the repairing component 108 according to a preferred embodiment of the present invention. The main touch area 333 of the panel module 104 comprises: a first substrate 404; a first conductive layer 408 disposed on the first substrate 404; a spacer layer 412 having a plurality of spacers and disposed on the first conductive layer 408; a second conductive layer 416 disposed on the spacer layer 412; and a second substrate 420 disposed on the second conductive layer 416. The first substrate 404 and the second substrate 420 are made of various transparent resilient materials, including but not limited to polycarbonate (PC), polyimide (PI), polyethylene terephthalate (PET), glass, and acrylate, but the present invention is not limited thereto. The first conductive layer 408 and the second conductive layer 416 are made of various transparent conductive materials, including but not limited to conductive polymer, indium tin oxide (ITO), indium zinc oxide (IZO), aluminum-doped zinc oxide (AZO), zinc oxide (ZnO), and monocrystalline tin oxide crystal (SnO), but the present invention is not limited thereto. The spacers 412 not only enable the first conductive layer 408 and the second conductive layer 416 to be spaced apart from each other by a specific distance, but also enable the first conductive layer 408 and the second conductive layer 416 to come into contact with each other as soon as the second conductive layer 416 is touched and deformed. When the second conductive layer 416 is touched and deformed, the distance between the first conductive layer 408 and the second conductive layer 416 ranges between 1 μm and 1000 μm. The spacers 412 are made of glass, plastic, polymer, oxide particles, or a combination thereof, but the present invention is not limited thereto. The repairing touch area 336 of the repairing component 108 is structurally similar to the main touch area 333 of the panel module 104.

Figure 5:
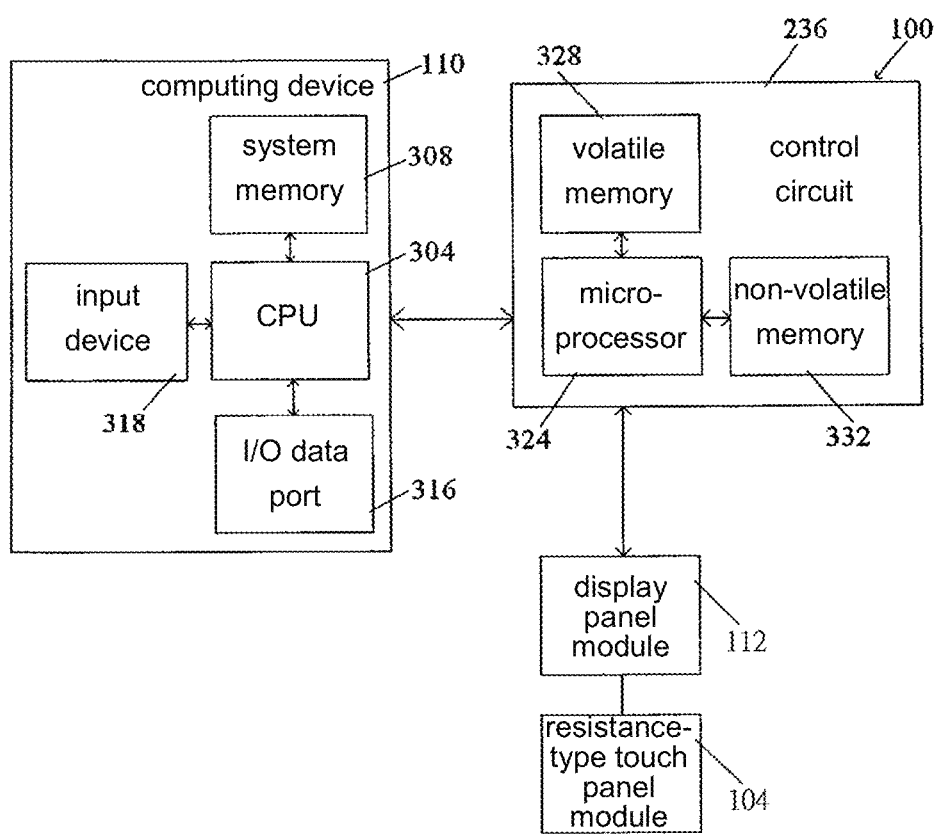
FIG. 5 is a block diagram of the display device shown in FIG. 2 according to a preferred embodiment of the present invention.

Referring to FIG. 5, there is shown a block diagram of the display device 100 shown in FIG. 2, wherein the display device 100 comprises the computing device 110, the resistance-type touch panel module 104, the display panel module 112, and the control circuit 236. In a preferred embodiment of the present invention, the computing device 110 is a computer or a main system, and the computing device 110 comprises a CPU 304, a system memory 308, and at least one I/O data port 316. In a preferred embodiment, the control circuit 236 comprises a microprocessor 324, a volatile memory (such as SRAM) 328, and a non-volatile memory (such as flash memory) 332. The display device 100 further comprises an input device 318 (such as a keyboard) and a speaker (not shown). The CPU 304 communicates with the system memory 308 by means of an address/data bus (not shown). The microprocessor 324 is any commercially-available or custom-made microprocessor. The system memory 308 includes, but is not limited to, the following devices: SRAM, DRAM, ROM, PROM, EPROM, EEPROM, and flash memory. The components are conventional components, such as those components which are for use in many conventional data processing systems, and can be configured to operate in the manner described herein.

The system memory 308 comprises a plurality of software and data for use in the computing device 110, including: an operating system (not shown); an application (not shown); an input/output (I/O) device driver (not shown); and data (not shown). Persons skilled in the art understand that the operating system operates in conjunction with the computing device 110 and can comprise: OS/2, AIX or System 390 developed by International Business Machines Corporation based in Armonk, N.Y., USA; and Windows 95, Windows 98, Windows 2000, Windows XP, and Windows Vista developed by Microsoft Corporation based in Redmond, Wash., USA. The I/O device driver typically comprises a software routine whereby the I/O device driver communicates with the at least one I/O data port 316, a data storage device (not shown), and the system memory 308. The application is for use in executing programs pertaining to various functions of the computing device 110. The data include static and dynamic data for use by the application, the operating system, the I/O device driver, and any other software programs stored in the memory, wherein part of the data is displayed on a monitor. The components/programs are conventional components/programs, such as those components/programs which are used in many conventional data processing systems, and can be configured to operate in the manner described herein. OS/2, AIX, System 390 are registered trademarks owned by International Business Machines Corporation. Windows 95, Windows 98, Windows 2000, Windows XP, and Windows Vista are registered trademarks owned by Microsoft Corporation.

The display panel module 112 is a conventional display panel, including but not limited to a liquid crystal display module. Its liquid crystal screen does not emit light, and thus it has to rely upon a backlight in order to display. The liquid crystal display module 112 comprises a backlight source, a light guide plate, a polarizer, liquid crystal, a color film, and another polarizer. After being emitted from the backlight source, light is evenly scattered by the light guide plate, passes through the polarizer, the liquid crystal, the color film, and the polarizer in sequence, and eventually falls on the liquid crystal screen. The components are part of a conventional panel and thus are not described herein for the sake of brevity.

Figure 6:
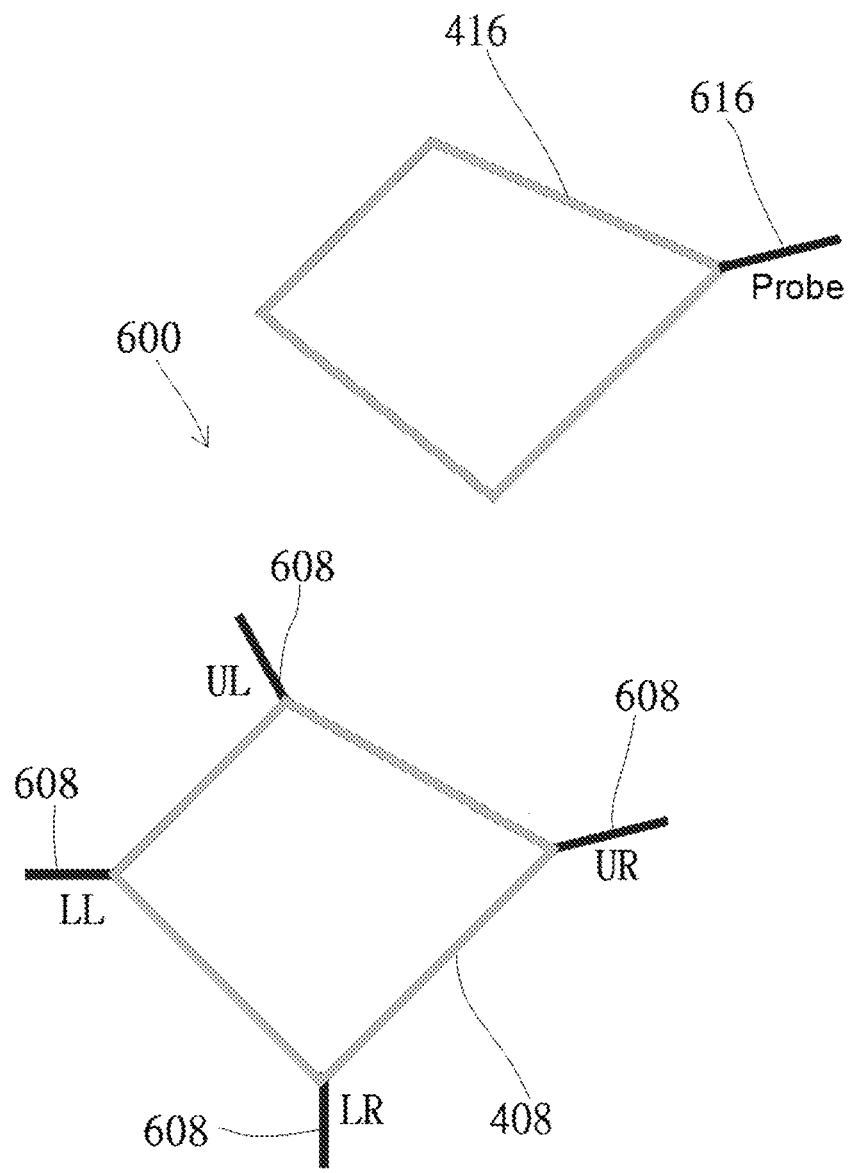
FIG. 6 is a schematic view of a conventional five-line resistance-type touch panel module.

Referring to FIG. 6, there is shown a schematic view of the touch of a conventional five-line resistance-type touch panel module 600. Module 600 comprises a probe 616 and four voltage input lines 608 (UL, LL, UR, LR). The voltage input lines 608 (UL, LL, UR, LR) are electrically connected to the first conductive layer 408 and positioned proximate to the four corners of the rectangular first conductive layer 408, respectively. A probe 616 is electrically connected to the second conductive layer 416. Bias voltage is input to the voltage input lines 608 (UL, LL, UR, LR) alternately. The second conductive layer 416 receives and detects the voltage level. A high voltage level is input to the upper left corner and the lower left corner. First, a low voltage level is input to the upper right corner and the lower right corner. According to the partial voltage principle, after the user has given a touch to the module 600, the position of the touch point in the first direction is calculated, using the voltage level received and detected by the second conductive layer 416. Then, a high voltage level is input to the upper left corner and the upper right corner, and a low voltage level is input to the lower left corner and the lower right corner, such that the position of the touch point in the second direction is calculated. The five-line resistance-type touch panel module 600 is disclosed in the prior art and thus is not described herein for the sake of brevity.

Figure 7:
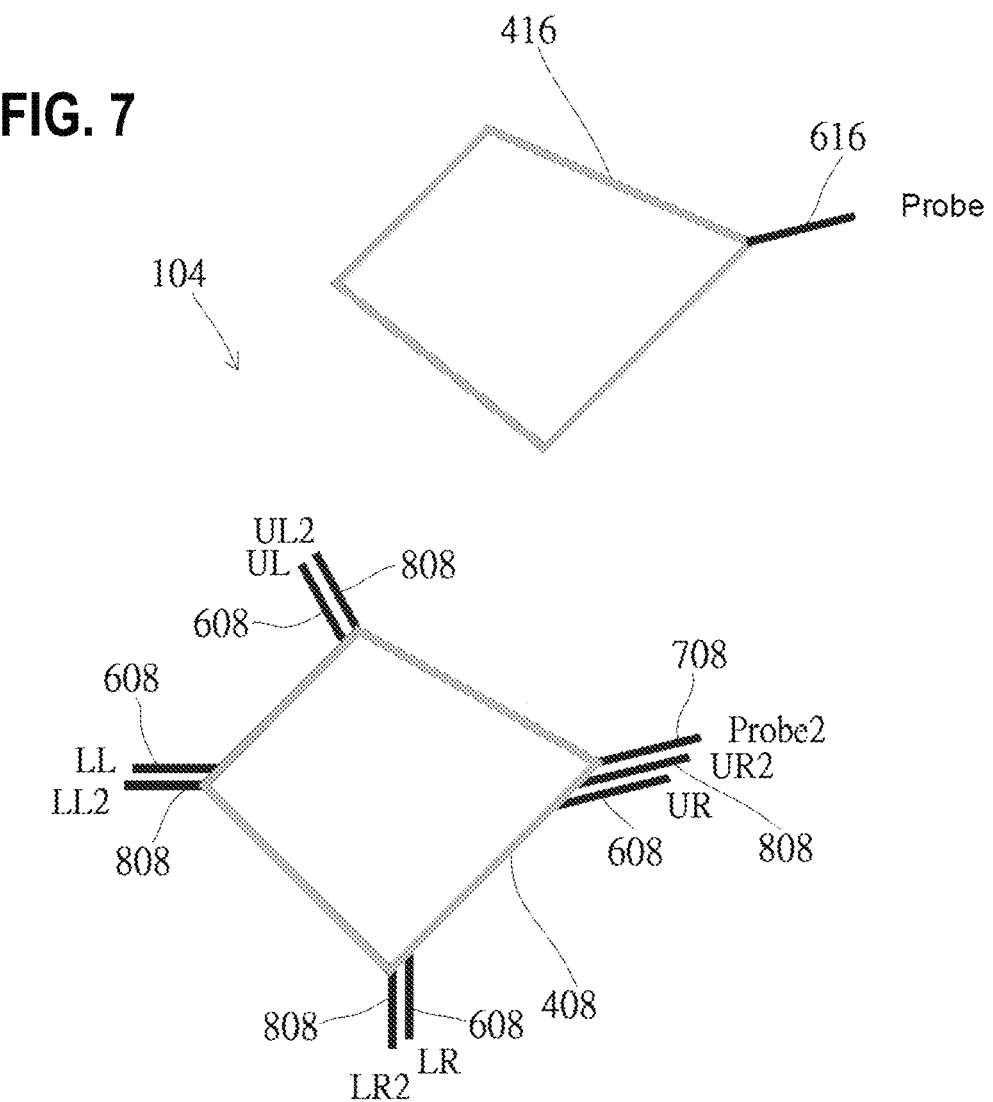
FIG. 7 is a schematic view of a five-line resistance-type touch panel module according to a preferred embodiment of the present invention.

The present invention is directed to repairing the touch panel 104 by means of the repairing component 108. The five-line resistance-type touch panel module 104 of the present invention is structurally different from the conventional five-line resistance-type touch panel module 600 shown in FIG. 6. FIG. 7 depicts a novel five-line resistance-type touch panel module 104. In addition to the probe 616 and the four voltage input lines 608 (UL, LL, UR, LR) shown in FIG. 6, the five-line resistance-type touch panel module 104 shown in FIG. 7 comprises a second probe (probe 2) 708 and four second voltage input lines 808 (UL2, LL2, UR2, LR2) electrically connected to the first conductive layer 408 and positioned proximate to the four corners of the rectangular first conductive layer 408, respectively. Probe 2 708 is also electrically connected to the first conductive layer 408. Probe 2 708 is disposed on the first conductive layer 408 in the same manner as the probe 616 is disposed on second conductive layer 416 and thus is not described herein for the sake of brevity.

Figure 8:
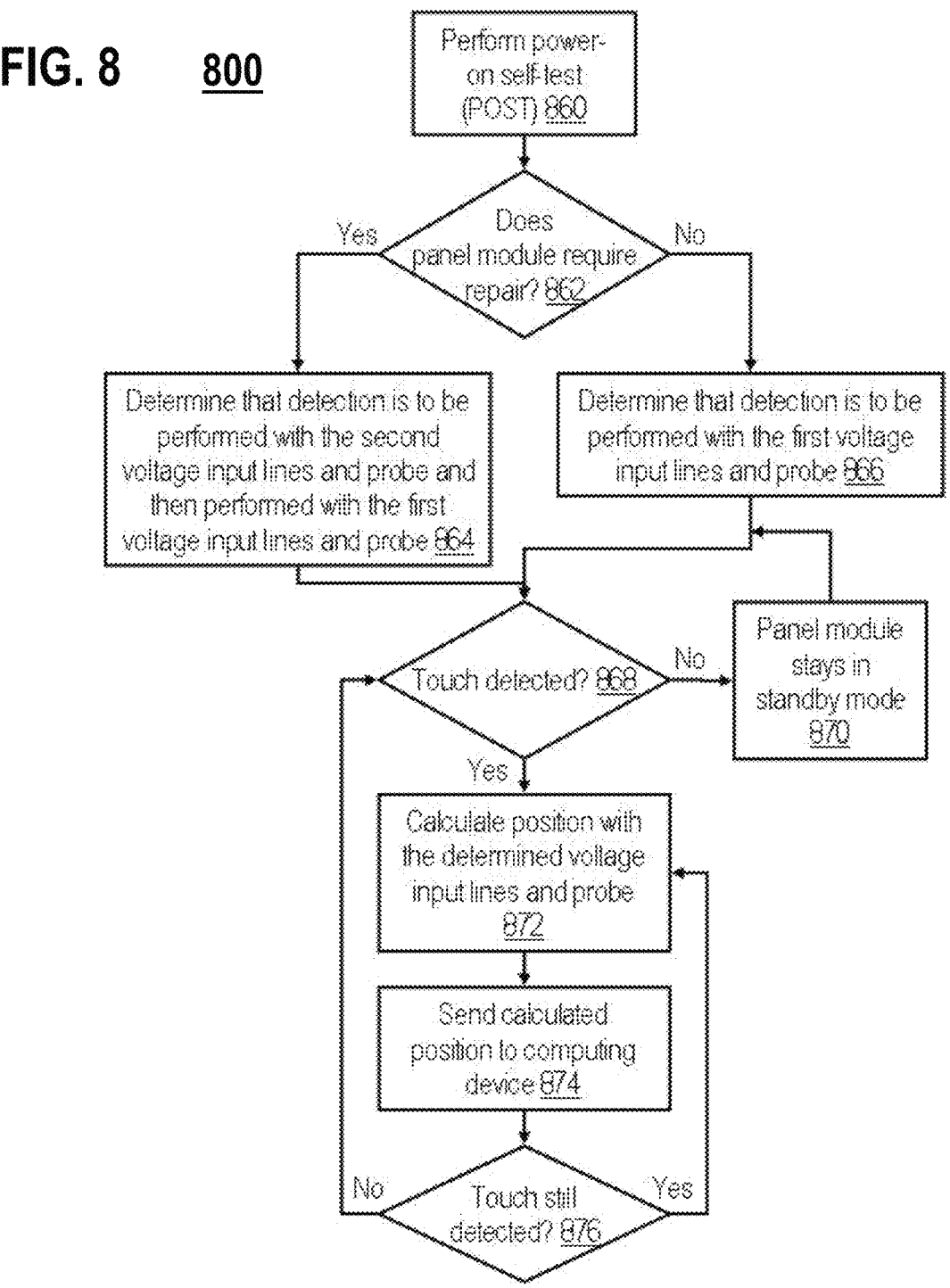
FIG. 8 is a flow chart of a touching and detecting operation of the five-line resistance-type touch panel module according to a preferred embodiment of the present invention.

The present invention is further characterized in that the repairing component 108 substitutes for the touch failure part 155, and thus the five-line resistance-type touch panel module 104 of the present invention operates in a manner different from the conventional five-line resistance-type touch panel module 600. Referring to FIG. 8, there is shown a flowchart of a method 800 for performing a touching and detecting operation on a five-line resistance-type touch panel module 104 according to a preferred embodiment of the present invention. The touching and detecting method 800 is implemented with a computer program segment pertaining to a specific function, or implemented with the control circuit 236 having a micro-controller and a memory. The touching and detecting method 800 comprises the steps as follows:

Step 860: performing power-on self-test (POST) to perform a self test when booting, for example, testing to determine whether the touch failure part 155 is present on the resistance-type touch panel module 104.

Step 862: determining whether to repair the resistance-type touch panel module 104 with the repairing component 108. In a preferred embodiment, if the touch failure part 155 exists, repair will be carried out. If the touch failure part 155 does not exist, the resistance-type touch panel module 104 will be functioning correctly. To carry out repair, the process proceeds to step 864; otherwise, the process passes to step 866.

Step 864: determining that detection is to be performed with the second voltage input lines (LR2, LL2, UR2, UL2) and the second probe (probe 2), and then detection is to be performed with the first voltage input lines (LR, LL, UR, UL2) and the probe 2. In other words, step 864 involves detecting a touch (of the repairing component 108) by means of the repairing component 108 and then detecting a touch (of touch panel module 104, as opposed to a corresponding point at the repairing component 108) by means of the touch panel module 104.

Step 866: determining that detection is to be performed with a probe and the original voltage input lines (LR, LL, UR, UL) of the resistance-type touch panel module 104; in other words, if the resistance-type touch panel module 104 is functioning well, the touch detection will be performed with the touch panel module 104.

Step 868: Is a touch of the resistance-type touch panel module 104 detected? If the answer is negative, the process proceeds to step 870; otherwise, the process proceeds to step 872.

Step 870: since no touch is detected, the resistance-type touch panel module 104 stays in a standby mode, and the loop repeats.

Step 872: a touch is detected, and thus the position is calculated with the determined voltage input lines and probe as follows: (A) detection is performed with the voltage input lines (LR2, LL2, UR2, UL2) and the probe 2, and then detection is performed with the voltage input lines (LR2, LL2, UR2, UL2) and the probe 2; or (B) detection is performed with the voltage input lines (LR, LL, UR, UL) and the probe.

Step 874: sending the calculated position to the computing device 110.

Step 876: Is a touch on the resistance-type touch panel module 104 still detected? If the answer is affirmative, the process passes to step 868; otherwise, the process proceeds to step 872.

Figure 9:
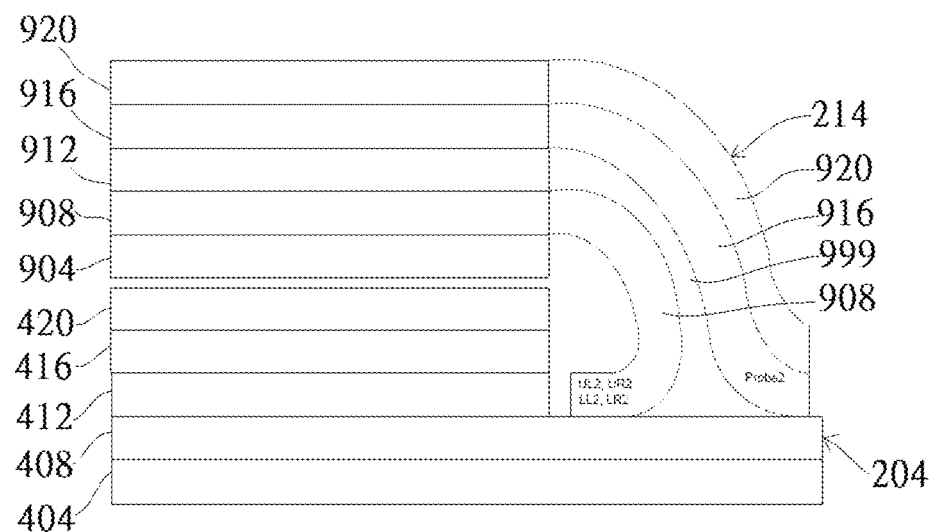
FIG. 9 is a schematic view of coupling a first contact and a second contact according to a preferred embodiment of the present invention.

Referring to FIG. 9, there is shown a schematic view of electrically coupling the first contacts 204, 208 of the panel module 104 and the second contacts 214, 218 of the repairing component 108 according to a preferred embodiment of the present invention. The preferred embodiment of the present invention is exemplified by the first contact 204 and the second contact 214. As described above, the main touch area 333 of the resistance-type touch panel module 104 comprises: a first substrate 404, a first conductive layer 408, a spacer layer 412 having a plurality of spacers, a second conductive layer 416, and a second substrate 420. Likewise, the repairing touch area 336 of the repairing component 108 comprises: a repairing component first substrate 904; a repairing component first conductive layer 908 disposed on the repairing component first substrate 904; a repairing component spacer layer 912 having a plurality of spacers and disposed on the repairing component first conductive layer 908; a repairing component second conductive layer 916 disposed on the repairing component spacers 912; and a repairing component second substrate 920 disposed on the repairing component second conductive layer 916. Likewise, the repairing component first substrate 904 and the repairing component second substrate 920 are made of various transparent resilient materials, including but not limited to polycarbonate, polyimide, polyethylene terephthalate, glass, and acrylate, but the present invention is not limited thereto. The repairing component first conductive layer 908 and the repairing component second conductive layer 916 are made of various transparent conductive materials, such as conductive polymer, indium tin oxide (ITO), indium zinc oxide, aluminum-doped zinc oxide, zinc oxide, and monocrystalline tin oxide crystal, but the present invention is not limited thereto. The repairing component spacers 912 enable the repairing component first conductive layer 908 and the repairing component second conductive layer 916 to be spaced apart from each other by a specific distance, and enable the repairing component first conductive layer 908 and the repairing component second conductive layer 916 to come into contact with each other as soon as the repairing component second conductive layer 916 is touched and deformed, wherein the distance between the repairing component first conductive layer 908 and the repairing component second conductive layer 916 ranges between 1 μm and 1000 μm when the repairing component second conductive layer 916 is not touched. The repairing component spacers 912 can be made of glass, plastic, polymer, oxide particles, or a combination thereof, but the present invention is not limited thereto.

The first contacts 204 of the resistance-type touch panel module 104 are formed by making the second substrate 420, the second conductive layer 416, and the spacers 412 shorter than the first conductive layer 408 and the first substrate 404, so as to expose the first conductive layer 408 (and thus the first contacts 204, 208 are disposed on the edges of the two ends of the main touch area 333, respectively). Alternatively, an equivalent structure can be formed by any other means, and the present invention is not limited to any specific structure. The second contacts 214, 218 are disposed on the edges of the two ends of the repairing touch area 336 of the repairing component 108, respectively. Taking the second contact 214 as an example, the repairing component first conductive layer 908, the repairing component second conductive layer 916, and the repairing component second substrate 920 are made longer than the repairing component first substrate 904 and the repairing component spacer layer 912. An isolating layer 999 is formed between the repairing component first conductive layer 908 and the repairing component second conductive layer 916 and positioned distal to the repairing component spacer layer 912 to thereby isolate the repairing component first conductive layer 908 and a repairing component second conductive layer 916. Alternatively, an equivalent structure can be formed by other means, but the present invention is not limited thereto. The isolating layer 999 can be made of various isolating materials, including but not limited to an isolating glue, an isolating film, and an isolating tape, but the present invention is not limited thereto.

The first contact 204 (208) and the second contact 214 (218) can be electrically coupled in various manners, for example, including but not limited to being laminated together or being glued together with a conductive adhesive, but the present invention is not limited thereto. The isolating layer 999 isolates the repairing component first conductive layer 908 and the repairing component second conductive layer 916 completely; hence, after the first contact 204 (208) and the second contact 214 (218) have been electrically coupled, the repairing component first conductive layer 908 is electrically coupled to the voltage input lines 808 (UL2, LL2, UR2, LR2). The repairing component second conductive layer 916 is electrically coupled to the probe 2 708, such that the resistance-type touch panel module 104 can operate in the manner illustrated with FIG. 1 through FIG. 9.

In the preferred embodiment, the touch panel 104 is repaired with a repairing component 108. However, in another preferred embodiment, the touch panel 104 is repaired with two or more repairing components 108, so as to calculate the partial voltage and detect the touch position by the principle, the method, and the devices illustrated with FIG. 1 through FIG. 9.

The touch panel module of the present invention is not restricted to the resistance-type touch panel module. In fact, the touch panel module can be provided in various forms, including a resistance-type touch panel module, and a capacitance-type touch panel module, and thus the present invention is not limited thereto. The resistance-type touch panel module of the present invention is not restricted to the five-line resistance-type touch panel module, but can come in various forms, such as four-line, five-line, seven-line, and eight-line resistance-type touch panel modules.

The present invention is directed to repairing a touch panel and is applicable to the situation where a touch panel is touched so often that it is impossible to judge a press point or likely to judge the press point wrongly. Furthermore, in the situation where a specific area is pressed very often, the present invention is markedly efficient, features a simple manufacturing process, labor saving, and resource saving, and is environmental friendly.

As will be appreciated by one skilled in the art, the present invention may be embodied as a computer device, a method or a computer program product. Accordingly, the present invention may take the form of an entirely hardware embodiment, an embodiment including software (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method for repairing a touch panel, the method comprising:
providing a touch panel having a touch failure portion and a pair of first contacts, and a main touch area having two edges, and wherein the pair of first contacts disposed on the two edges of the main touch area;
providing a repairing component having a repairing touch area and a pair of second contacts;
positioning on the touch panel the repairing component corresponding in position to the touch failure portion, and the pair of second contacts disposed on the two edges of the main touch area; and
electrically coupling the pair of first contacts to the pair of second contacts;
wherein the main touch area and the repairing touch area having substantially identical touch-control structure.

2. The method of claim 1, wherein the main touch area further comprises:
a first substrate;
a first conductive layer disposed on the first substrate;
a spacer layer having a plurality of spacers and disposed on the first conductive layer;

a second conductive layer disposed on the spacer layer; and
a second substrate disposed on the second conductive layer.

3. The method of claim 2, wherein:
the main touch area further comprises:
   a first probe disposed in the second conductive layer;
   first voltage input lines disposed in the first conductive layer;
   second voltage input lines disposed in the first conductive layer; and
   a second probe disposed in the first conductive layer;
the method further comprises:
   detecting a touch of the touch failure portion of the touch panel utilizing the second voltage input lines and the second probe; and
   detecting a touch of another portion of touch panel not within the touch failure portion utilizing the first voltage input lines and the first probe.

4. The method of claim 2, wherein:
the second substrate, the second conductive layer, and the spacer layer have a shorter length than the first conductive layer and the first substrate, such that edge portions of the first conductive layer are exposed to form the pair of first contacts; and
electrically coupling the pair of first contacts to the pair of second contacts includes electrically coupling the second contacts to the edge portions of the first conductive layer.

5. A repairable touch panel, comprising:
a main touch area having a pair of first contacts disposed on two edges thereof, wherein the main touch area includes:
   a first substrate;
   a first conductive layer disposed on the first substrate, the first conductive layer including a first probe and first voltage lines and a second probe and second voltage lines;
   a spacer layer having a plurality of spacers and disposed on the first conductive layer;
   a second conductive layer disposed on the spacer layer; and
   a second substrate disposed on the second conductive layer;
wherein a touch of a touch failure portion of the touch panel is detected utilizing the second voltage input lines and the second probe and a touch of another portion of touch panel not within the touch failure portion is detected utilizing the four first voltage input lines and the first probe.

6. The repairable touch panel of claim 5, wherein:
the first substrate and the second substrate are made of a transparent resilient material which is one selected from the group consisting of polycarbonate (PC), polyimide (PI), polyethylene terephthalate (PET), glass, and acrylate;
the first conductive layer and the second conductive layer are made of a transparent conductive material which is one selected from the group consisting of conductive polymer, indium tin oxide (ITO), indium zinc oxide (IZO), aluminum-doped zinc oxide (AZO), zinc oxide (ZnO), and monocrystalline tin oxide crystal (SnO); and
the spacers are made of one selected from the group consisting of glass particles, plastic particles, polymer particles, and oxide particles.

7. A display apparatus comprising:
the repairable touch panel of claim 5; and
a repairing component including a repairing touch area having a pair of second contacts disposed on two edges thereof, wherein:
   the repairing component is positioned on the touch panel such that the repairing touch area corresponds in position to a touch failure portion of the main touch area; and
   the pair of first contacts are electrically coupled to the pair of second contacts.

8. The display apparatus of claim 7, wherein:
the repairing component first conductive layer, the repairing component second conductive layer, and the repairing component second substrate have a greater length than the repairing component first substrate and the repairing component spacer layer, such that the pair of second contacts are formed; and
the display apparatus further includes an isolating layer disposed between the repairing component first conductive layer and the repairing component second conductive layer.

9. The display apparatus of claim 7, wherein the repairing touch area further comprises:
   a repairing component first substrate;
   a repairing component first conductive layer disposed on the repairing component first substrate;
   a repairing component spacer layer having a plurality of spacers and disposed on the repairing component first conductive layer;
   a repairing component second conductive layer disposed on the repairing component spacers; and
   a repairing component second substrate disposed on the repairing component second conductive layer.

10. A display apparatus, comprising:
a touch panel having a touch failure portion and a pair of first contacts, and a main touch area having two edges, and wherein the pair of first contacts disposed on the two edges of the main touch area; and
a repairing component having a repairing touch area and a pair of second contacts, wherein:
   the repairing component is positioned on the touch panel at a position corresponding to the touch failure portion, and the pair of second contacts disposed on the two edges of the main touch area; and
   the pair of first contacts is electrically coupled to the pair of second contacts;
wherein the main touch area and the repairing touch area having substantially identical touch-control structure.

11. The display apparatus of claim 10, wherein the main touch area further comprises:
   a first substrate;
   a first conductive layer disposed on the first substrate;
   a spacer layer having a plurality of spacers and disposed on the first conductive layer;
   a second conductive layer disposed on the spacer layer; and
   a second substrate disposed on the second conductive layer.

12. The display apparatus of claim 11, wherein:
the main touch area further comprises:
   a first probe disposed in the second conductive layer;
   first voltage input lines disposed in the first conductive layer;
   second voltage input lines disposed in the first conductive layer; and
   a second probe disposed in the first conductive layer;
   a touch of the touch failure portion of the touch panel is detected utilizing the second voltage input lines and the second probe and a touch of another portion of touch panel not within the touch failure portion is detected utilizing the first voltage input lines and the first probe.

13. The display apparatus of claim 11, wherein the second substrate, the second conductive layer, and the spacer layer have a shorter length than the first conductive layer and the first substrate, such that edge portions of the first conductive layer are exposed to form the pair of first contacts.

14. The display apparatus of claim 10, wherein the repairing touch area comprises:
   a repairing component first substrate;
   a repairing component first conductive layer disposed on the repairing component first substrate;
   a repairing component spacer layer having a plurality of spacers and disposed on the repairing component first conductive layer;
   a repairing component second conductive layer disposed on the repairing component spacers; and
   a repairing component second substrate disposed on the repairing component second conductive layer.

15. The display apparatus of claim 14, wherein:
   the repairing component first conductive layer, the repairing component second conductive layer, and the repairing component second substrate have a greater length than the repairing component first substrate and the repairing component spacer layer, such that the pair of second contacts are formed; and
   the display apparatus further includes an isolating layer disposed between the repairing component first conductive layer and the repairing component second conductive layer.

* * * * *